United States Patent
Fonville et al.

(10) Patent No.: US 6,827,353 B2
(45) Date of Patent: Dec. 7, 2004

(54) EXTERNALLY SUPPORTED WIDE TOLERANCE SEAL

(75) Inventors: Carl E. Fonville, Ann Arbor, MI (US); Michael A. Karram, Burton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/396,801

(22) Filed: Mar. 24, 2003

(65) Prior Publication Data

US 2004/0188953 A1 Sep. 30, 2004

(51) Int. Cl.$^7$ ............................. F02F 11/00; F16J 15/02
(52) U.S. Cl. ........................ 277/598; 277/644; 277/648
(58) Field of Search ................................ 277/590–591, 277/628, 630, 637, 639, 644, 648–649

(56) References Cited

U.S. PATENT DOCUMENTS

| | | | | |
|---|---|---|---|---|
| 4,192,520 A | * | 3/1980 | Hasegawa | 277/591 |
| 4,501,432 A | * | 2/1985 | Kuniyoshi et al. | 277/591 |
| 4,597,583 A | * | 7/1986 | Inciong et al. | 277/591 |
| 4,934,715 A | * | 6/1990 | Johnson | 277/647 |
| 5,687,975 A | * | 11/1997 | Inciong | 277/591 |
| 6,224,058 B1 | * | 5/2001 | Drebing et al. | 277/313 |

FOREIGN PATENT DOCUMENTS

| | | | | | |
|---|---|---|---|---|---|
| JP | 02248642 A | * | 10/1990 | ............ | F02F/11/00 |
| JP | 03061768 A | * | 3/1991 | ............ | F16J/15/10 |
| JP | 05288116 A | * | 11/1993 | ............ | F02F/11/00 |
| JP | 06058421 A | * | 3/1994 | ............ | F16J/15/10 |
| JP | 06281013 A | * | 10/1994 | ............ | F16J/15/10 |

* cited by examiner

*Primary Examiner*—Alison Pickard
*Assistant Examiner*—Vishal Patel

(57) ABSTRACT

A fluid container assembly design has a wide tolerance variation in the width of an open seal gap between opposed sealing surfaces of different assemblies. A resilient seal is provided with a generally rectangular central section partially supported within a groove and partially unsupported by excessive extension beyond the groove. To avoid buckling, the extending portion includes resilient stabilizers including barb-like projections. These resiliently engage a component surface adjacent the groove to stabilize the extending portion and prevent buckling. This allows the seal to compress over its total height to seal the gap between the bottom of the retaining groove in one component and the opposite sealing surface of the other assembly component while the stabilizer projections yield to avoid involvement in the sealing function and act only to prevent buckling of the seal unsupported portion. Exemplary applications for engine rocker covers and oil pan-crankshaft seal gaps are disclosed.

10 Claims, 4 Drawing Sheets

EXTERNALLY SUPPORTED WIDE TOLERANCE SEAL

TECHNICAL FIELD

This invention relates to seals for fluid containers and, more particularly, to containers with open gaps having a wide gap tolerance and seals adapted therefor.

BACKGROUND OF THE INVENTION

It is known in the art relating to fluid container seals that for long term life, a resilient seal material has a limited range of compression within which it may be expected to provide an effective seal over a maximum lifetime. If the seal is under compressed, its sealing effectiveness may be compromised. However, if the material is over compressed, conditions of beat and exposure to fluids such as oil, may significantly impact the ability of the seal to perform its intended function.

Designing seals for joints where two machined surfaces are maintained in direct engagement with one another is relatively simple. A groove is provided in one of the surfaces for receiving the seal, which is designed with a length of extension beyond the depth of the groove, so that upon engagement of the surfaces to be sealed, compression of the seal material will fall within the desired compression range for maximum life. However, in some applications of seals in fluid containers the tolerances of the components to be scaled together are too large to allow direct contact between the sealing surfaces.

One example is a rocker cover for an automotive engine wherein, for noise isolation purposes, the rocker cover and the associated cylinder head or manifold, have a gap by design between the sealed surfaces which varies significantly from a condition of maximum stack-up or tolerances creating a wider gap and a minimum stack-up or tolerances creating a smaller gap. This situation may be compounded by a limit on the depth of the groove, which is provided in one of the components for supporting a generally rectangular seal in the groove and extending therebeyond. If such a seal extends beyond the supporting portion of the groove by an excessive length, the unsupported portion of the seal will buckle when compressed, resulting in inadequate compression or rotating in the groove, which leads to unsatisfactory seal performance.

SUMMARY OF THE INVENTION

The present invention provides supplemental support by the addition of two symmetrical barb-like projections that make contact outside of the retaining groove for an otherwise unsupported rectangular portion of a seal that extends beyond the retaining groove formed in one member of a container assembly. By providing this supplemental support, the seal is able to be extended a greater distance so as to close a larger gap than would be possible with a typical rectangular seal configuration. Accordingly, larger differences in the stack up gap or tolerances of the assembly may be accommodated by a molded seal acting within its ideal limits of compression.

We have learned that with a conventional rectangular seal, the unsupported seal height beyond the groove should not be more than about 1.5 times the supported seal height within the groove. Otherwise, the seal will buckle when compressed unless some additional support is provided for the portion of the seal height which extends beyond the supporting length of the groove in which the seal is retained.

In a preferred embodiment, a seal according to the invention includes a linearly extending resilient seal body with a cross-sectional configuration including a generally rectangular central section of greater height than width and having first and second sealing edges at opposite ends of the height dimension. The central section includes first and second compressible portions extending inward from the first and second sealing edges and which represent the supported and unsupported portions of the seal.

Accordingly, the first compressible portion includes generally parallel sides which are adapted to be supported in a groove in a seal surface of one component of the assembly, wherein the first sealing edge engages the bottom of the groove for sealing the groove against fluid passage across the groove. The second compressible portion includes sides which carry resilient stabilizers, also of the same compressible material. The stabilizers are angled outward from the second sealing edge which is adapted to engage a flat surface of the other member of the container assembly. The stabilizers terminate in barb-like projections that are engageable with a flat portion of the grooved surface adjacent to the groove.

Upon compression of the seal, the stabilizers are compressed against the flat surface adjacent the groove of the grooved surface. The stabilizers are designed to resiliently yield as they provide support for the second compressible portion of the central section to prevent it from buckling while the seal is compressed to within its desired range of compression. The seal compression takes place over the entire seal height, from the first sealing edge engaging the bottom of the groove to the second sealing edge engaging the flat portion of the opposing surface of the joint.

An additional advantage of a seal according to the invention is that the resilient stabilizers, by their contact with the seal surface adjacent to the groove, help shield the seal against the entry of fluid or debris into the groove and thus help prolong seal life. This is especially advantageous when the seal groove is formed in a lower member of a container.

These and other features and advantages of the invention will be more fully understood from the following description of certain specific embodiments of the invention taken together with the accompanying drawings.

DESCRIPTION OF THE PREFERRED EMBODIMENT

Figure 1:
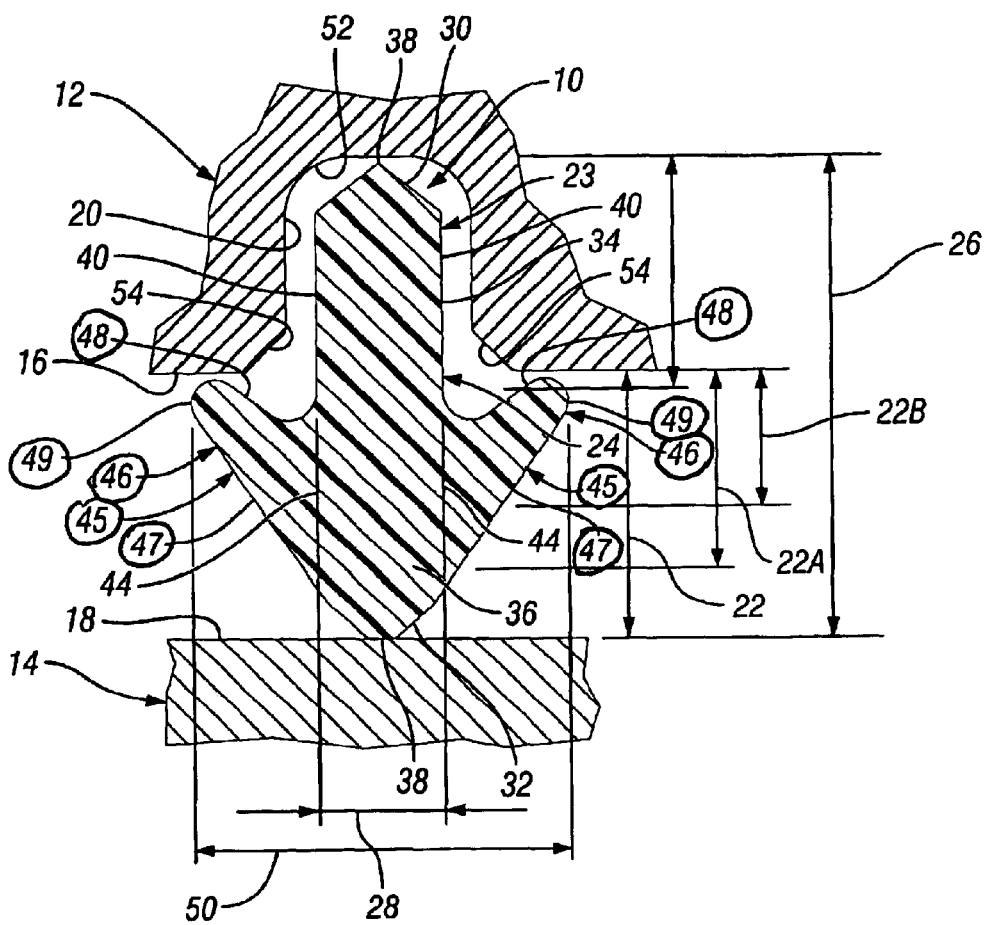
FIG. 1 is a cross-sectional view through a representative seal according to the invention having nominal dimensions and shown uncompressed between associated opposed sealing surfaces.

Referring first to FIG. 1 of the drawings in detail, numeral 10 generally indicates a nominal cross-sectional configuration of a linearly extending wide tolerance fluid seal according to the invention. The seal 10 is shown positioned between upper and lower components 12, 14 having opposed surfaces 16, 18. The upper surface 16 includes a groove 20 in which the seal 10 is retained as shown in a fully uncompressed condition. A linear dimension 22 between the surfaces 16, 18 represents a gap between the surfaces, the width of the gap being subsequently reduced upon completion of the assembly of components 12 and 14 with the seal in a compressed position.

Figure 2:
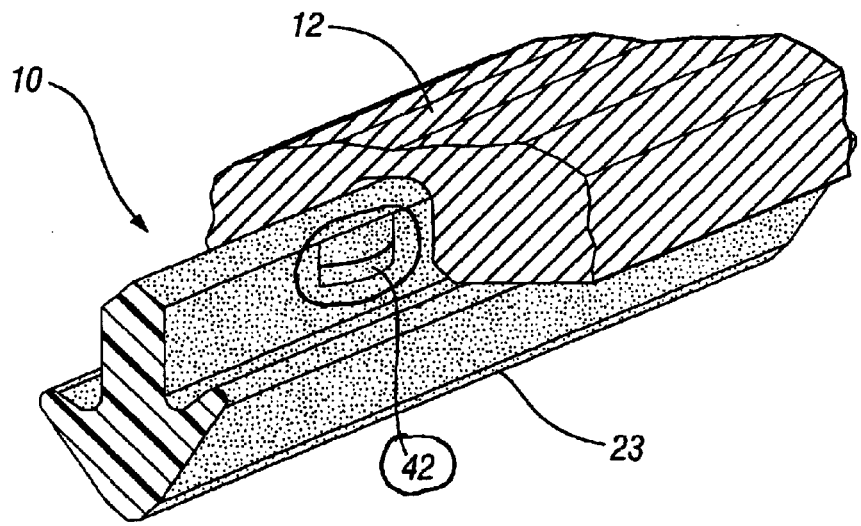
FIG. 2 is an isometric view of the seal of FIG. 1 showing the linearly extending body of the externally supported seal.

FIG. 2 is an isometric view illustrating a portion of the linearly extending body 23 of the seal 10. The body 23 is molded from a resilient seal material suitable for a particular seal application wherein the seal configuration and material are capable of satisfactory sealing of a fluid with a compression of the seal in the range of from about 20% to 35% of the total seal height.

In the uncompressed position as viewed in FIG. 1, the cross-sectional configuration of the seal includes a generally rectangular central section 24. The central section, as uncompressed, has a height 26 which is substantially greater than its width 28. First and second sealing edges 30, 32 are provided at opposite ends of the height dimension of the central section, which is divided, as an aid to description, into first and second compressible portions 34, 36. These extend inward toward one another from the first and second sealing edges 30, 32, respectively. The sealing edges 30, 32 are preferably formed by tapered opposite ends of the central section at 45° angles from contact points 38 at the tips of the opposite ends of the central portion.

The first compressible portion 34, which is the upper portion as shown in FIG. 1, includes generally parallel sides 40 for reception within the groove 20 of component 12. The sides 40 also include the typical longitudinally spaced barrel-like extension 42, shown in FIGS. 2, 4 and 5, which are provided for the purpose of retaining the seal in the groove prior to installation in an assembly.

The second compressible portion, or lower portion 36 of the central section 24, also includes sides 44 on which are carried resilient stabilizers 45. These angle outward and upward from the second sealing edge 32 and terminate in barb-like resilient projections 46 formed of the molded resilient material of the seal and giving the lower portion 36 the general appearance of a barbed arrowhead. The barb-like projections 46 include outer and inner sides 47, 48 which, when the seal is not compressed, are both angled outwardly away from the second sealing edge 32 and joined at rounded ends 49, as shown in the drawings, for engagement with the lower surface 16 of the upper component 12.

As subsequently described, the nominal dimensional relationships of the seal 10 and associated sealing surfaces, 52, 18 are exemplary only and not to be considered limiting as to the specific seal configuration for a particular application. FIG. 1 indicates the following nominal relationships. The width 28 (Wc) of the central section 24 is approximately 75% of the width (Wg) of the groove 20. Similarly, the nominal width 50 (Wp) of the resilient projections 48 is approximately 75% of the uncompressed height 26 (H) of the seal.

Dimension 22a represents the width of the gap 22 when the seal has been compressed to 20% of its free height 26 (H), representing, in this case, a recommended minimum compression for adequate sealing. Dimension 22b represents the width of the gap 22 when the seal has been further compressed to 35% of its uncompressed height 26 (H), which represents, in this case, the maximum recommended compression of the seal for long life operation of the seal in the compressed condition. Also noted is that the supporting depth of the groove 20 is the dimension, not indicated, from the bottom 52 of the groove to the upper edge of the chamfers 54 provided between the sides of the groove 20 and the flat sealing surface 16 of the upper component 12.

Figure 3:
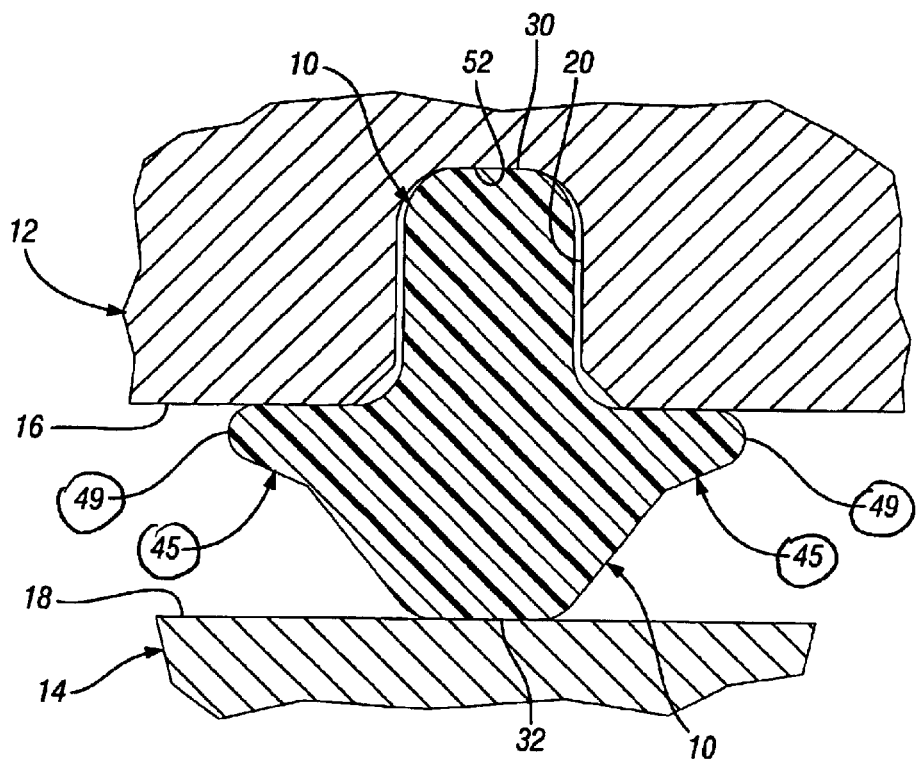
FIG. 3 is a cross-sectional view similar to FIG. 1 but showing the seal in the compressed condition.

Referring now to FIG. 3, there is illustrated the cross-sectional configuration of seal 10 in the fully compressed condition indicated by dimension 22b of FIG. 1. In this fully compressed condition, the resilient projections 48 of the stabilizers 46 have been deflected downward and outward so as to fully engage the lower surface 16 of the upper component 12. At the same time, the center section 24 of the seal 10 has been compressed to the maximum 35% compression condition. This causes the sealing edges 30, 32 to engage the bottom 52 of groove 20 and the opposite sealing surface 18 of the lower component 14 with a maximum sealing pressure or force that is effective to prevent the leakage of fluid past the seal through the gap 22.

The resilient stabilizers 46 do not perform a substantial sealing function in the compressed condition. However, they do exert stabilizing forces on the lower portion, or second compressible portion 36 of the central section 24, which prevents this portion 36 from buckling under the compression load. Without this stabilizing force, the lower, or second compressible portion 36, would buckle if it were not supported for a length which is greater than about 1.5 times of the length of the supported portion from the bottom of the groove 20 to the top of the chamfer 54.

Note that in the compressed condition, the upper portion or first compressible portion 34 of the central section 24 is forced up into the groove and expands to nearly the width of the groove. Further it is noted that the shape of the resilient projections 48 of stabilizers 46 is carefully controlled so that these extensions supply only a limited force against the upper sealing surface 16. They therefore have a minimum effect on the compression of the central section of the seal which is relied upon completely for providing the sealing function between the lower surface 18 and the bottom 52 of the groove 20.

Figure 4:
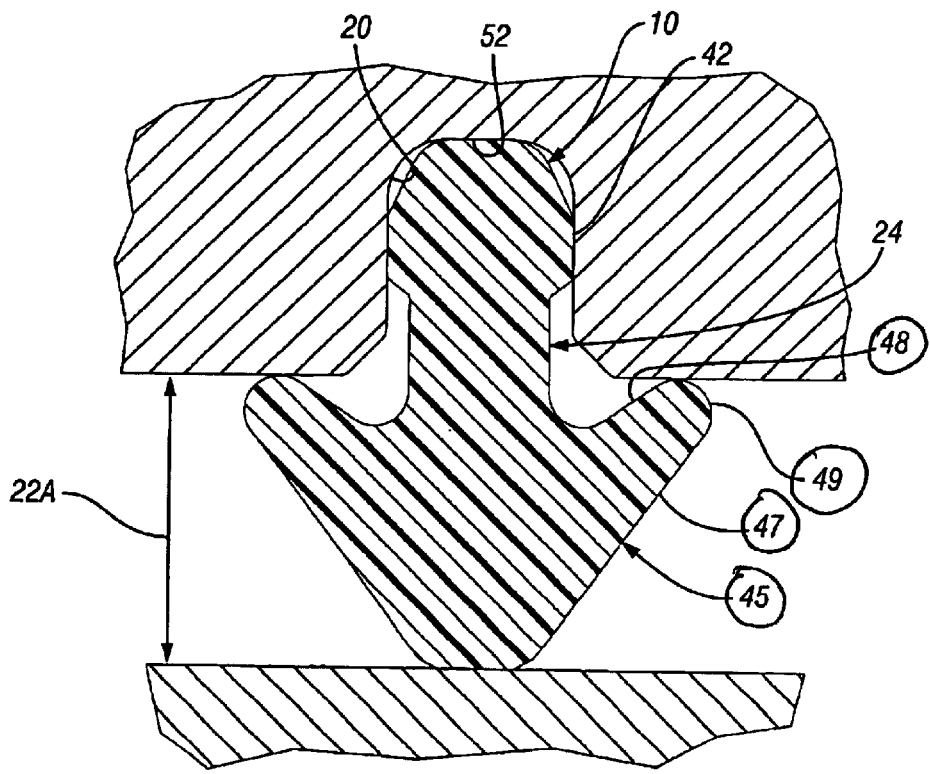
FIG. 4 is a view similar to FIG. 1 through a retention portion of the seal and showing the seal in a minimum compression position.

Referring now to FIG. 4, there is illustrated a cross-sectional configuration of the seal 10 illustrating the barrel-like projections 42 which engage the sides of the groove 20 and retain the seal within the groove before the seal is compressed in a component assembly as part of a fluid container. As shown in FIG. 4, the seal 10 has been compressed to its minimum compression level of 20% as indicated by dimension 22a. At this point, the stabilizer projections 48 are stabilizing the central section 24 against buckling by engaging with the projections 48 the lower surface 16 of the upper component 12.

Again, the resilient force of the projections 48 on the upper component is limited to that necessary to maintain the lower portion 36 of the central section in alignment and avoid buckling. Thus, operation of the stabilizers 46 does not adversely affect the compression function of the seal between the bottom 52 of the groove 20 and the sealing surface 18 of the lower component.

Figure 5:
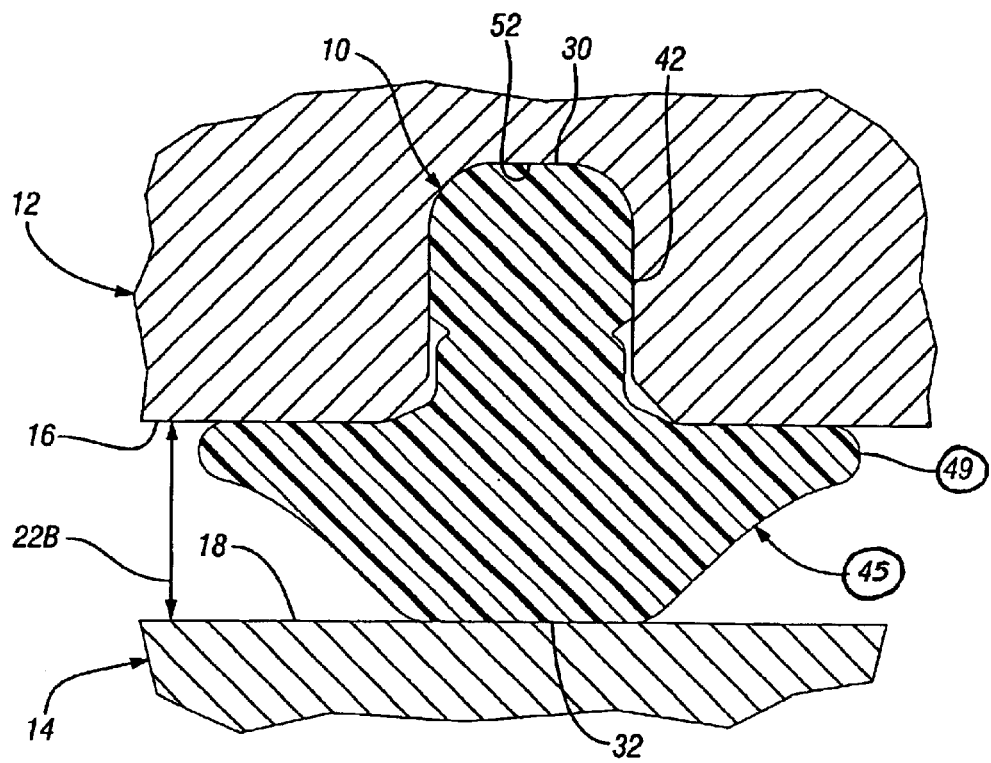
FIG. 5 is a view similar to FIG. 4 but showing the seal in a maximum compression position.

FIG. 5 similarly illustrates the fully compressed seal 10 in the cross section illustrated in FIG. 4. In this the stabilizer projections are fully extended as shown also in FIG. 3.

In order to determine the requirements for a seal of this type, a formula is proposed for determining the required seal height for a particular application in which the possible depth of the groove is limited and the tolerance of the parts results in a wide variation in the possible gap between the opposing seal engaging surfaces. The formula may be expressed in words as:
the uncompressed seal height equals the clearance variation of the assembly surfaces plus twice the seal profile tolerance divided by the compression range of the seal material.

Alternatively in mathematical form, the formula is:

$$H = \frac{A - B + 2C}{Uc - Lc}$$

where:
H=total seal height
A=maximum stack up-gap (at maximum tolerances)
B=minimum stack-up gap (at minimum tolerances)
C=the seal profile tolerance
Uc=the upper compression limit in percent and
Lc=the lower compression limit in percent.

The result of the calculation yields the nominal height H of the seal which can be used in an assembly to cover the complete range of stack-up gap or tolerance variations designed into the components. From the seal height (H) and the groove depth, the range of gaps required between the part surfaces may be calculated and the need for providing an externally supported seal in accordance with the invention may be determined.

The previously described embodiment represents a seal arrangement developed in particular for use in sealing a rocker cover on an automotive engine. However, essentially the same general configuration can be utilized in any suitable application for sealing gaps between fluid containers where a relatively wide tolerance leads to a significant variation in maximum and minimum gap figures for a sealed container assembly. Following is a second example wherein a seal according to the invention was developed for application to the gap between an engine crankshaft rear bearing cap and an associated oil pan semicircular cutout opposing the exterior of the crankshaft bearing cap.

In applying the invention to the oil pan design, it was found necessary to increase the gap between the sealing surfaces of the oil pan and the associated crankshaft rear bearing cap and front cover by an amount sufficient to allow for the relatively large tolerances on the parts to be accommodated and still remain within the range of seal compression which was allowed.

In order to accommodate the stack up tolerances, a substantial increase in the cross-sectional length of the seal was required, which then resulted in an extension of the seal beyond the groove to a dimension that exceeded the buckling factor by extending more than 1.5 times the length of the supported portion within the associated groove. As a result, application of the seal cross section of the present invention including the resilient stabilizers was utilized to support the otherwise unsupported portion of the seal and prevent it from buckling under compressive loads.

Figure 6:
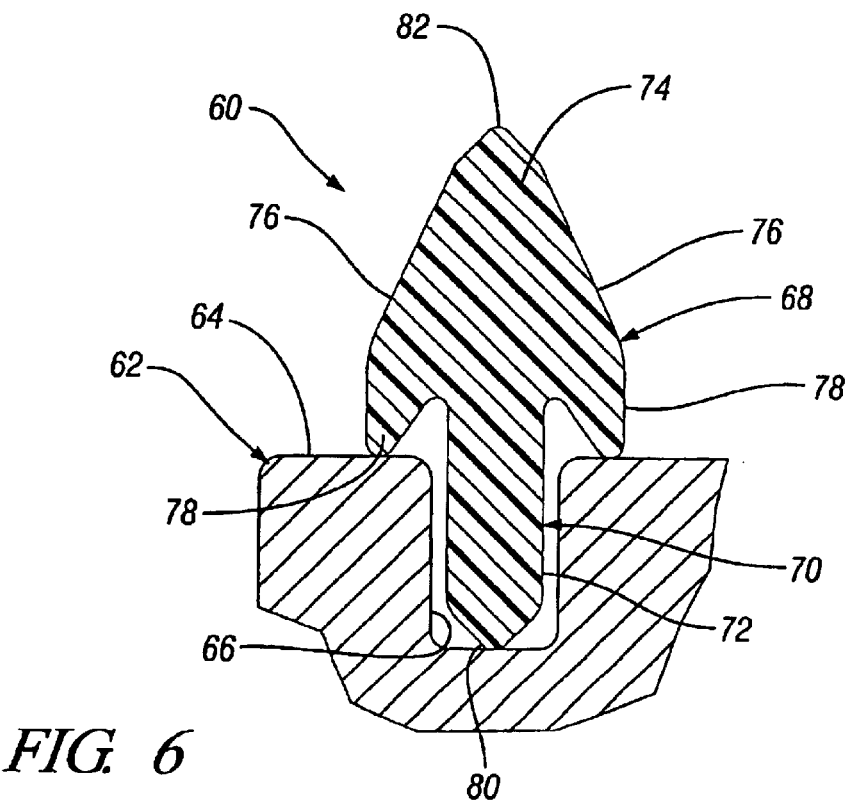
FIG. 6 is a cross-sectional view of a similar seal in position between a crankshaft bearing cap and an associated oil pan half-round opening.

Referring to FIG. 6, numeral 60 generally indicates a portion of the oil pan and seal assembly according to the invention. Assembly 60 includes an oil pan flange 62 having a half round sealing surface 64 with a central groove 66. A linear seal 68 includes a central section 70 of generally rectangular configuration and having a first compressible portion 72 which is received within the groove 66. In this design, the first compressible portion 72 forms the lower portion of the seal 60. An upper seal portion includes a second compressible portion 74 that extends upward above the sealing surface 64.

As in the previous embodiment, the second compressible portion includes resilient stabilizers 76 extending from sides of the second compressible portion and angling outward and downward to terminate in resilient barb-like protrusions 78, the tips of which engage the sealing surface 64. FIG. 6 illustrates the assembly in the uncompressed condition of the seal 68.

Figure 7:
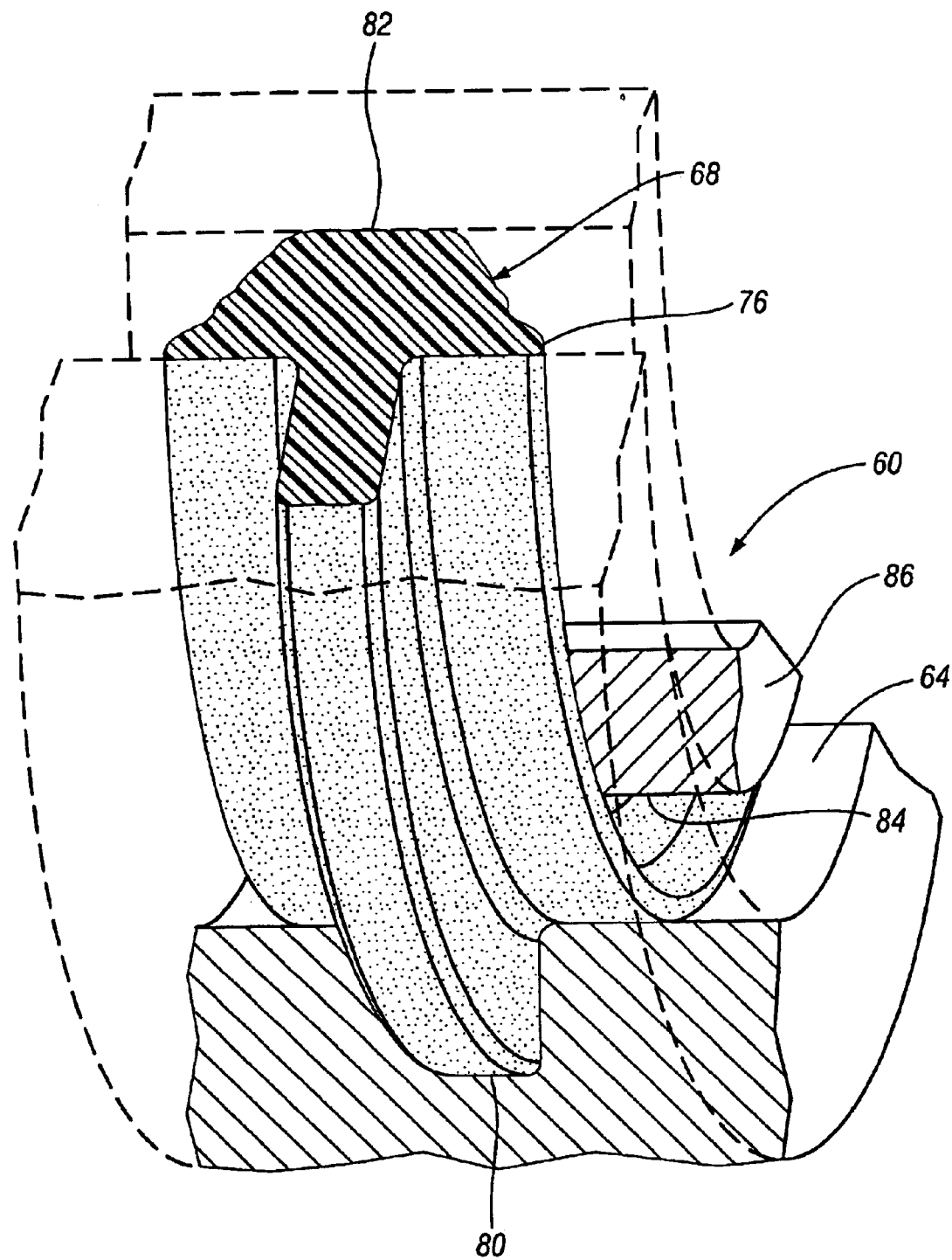
FIG. 7 is a pictorial view illustrating application of the seal of FIG. 6 in an engine application.

FIG. 7 shows a pictorial view of the seal assembly 60 in the assembled condition wherein the seal 68 is fully compressed with the resilient projections 78 flared out and flattened against the flange sealing surface 64 of the oil pan. The seal 68 includes a first sealing edge 80 that is flattened against the bottom of the groove 66 and a second sealing edge 82 that is flattened against a sealing surface 84 of the crankshaft bearing cap 86.

The configuration of the developed seal generally follows the form of the seal developed for the rocker cover application but is adjusted to suit the particular conditions of the application. For example, adjustment of the length of the supporting barb-like projections 78 may be required in order to avoid these supporting projections from extending beyond the width of the opposing seal surfaces of the assembly and thus opening the possibility of undesirable contact with other moving components of the engine.

In addition to the primary advantage of the resilient projections 78 and 48 provided for use in the exemplary seal embodiments just discussed, an additional advantage is that engagement of these seal projections with the associated seal surface on either sides of the groove provides an impediment to the leakage of fluids into the groove, particularly in the oil pan application, and to the migration of external debris into the other side of the groove from the portion of the seal which is exposed to ambient conditions outside of the container, in this case an oil pan or a rocker cover.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:
1. A seal for sealing a gap between opposing surfaces of a fluid container assembly having a predetermined tolerance for clearance between the surfaces, the seal comprising:
a linearly extending resilient seal body having a cross-sectional configuration including a generally rectangular central section of greater height than width with first and second sealing edges at opposite ends of the height dimension, the central section having first and second compressible portions extending inward from the first and second edges, respectively;
wherein the first compressible portion includes generally parallel sides adapted to be supported in a groove in one surface of the opposing surfaces with the first sealing edge engaging a bottom of the groove for sealing the groove against fluid passage across the groove; and
the second compressible portion is adapted to be unsupported and includes sides carrying resilient stabilizers angled outward from the second sealing edge and terminating in barb-like projections engagable with said one surface adjacent the groove and resiliently deformable to stabilize the unsupported second compressible portion by preventing buckling thereof upon compression of the seal, the barb-like projections including outer and inner sides which, when the seal is not compressed, are both angled outwardly away from the second sealing edge and joined at rounded ends for engagement with said one surface;

the stabilizers with the second sealing edge being adapted to close a major portion of the clearance between the surfaces prior to compression of the seal, and to resiliently engage said one surface for stabilizing the second compressible portion during compression of the central section between the first and second sealing edges; whereby compression of the seal occurs over the complete length of the central section between the first and second sealing edges and the stabilizers act primarily to stabilize the second portion against buckling under compression and are adapted to exert only limited compressive force against said one surface.

2. A seal as in claim 1 wherein the uncompressed seal height equal the clearance variation of the assembly surfaces plus twice a seal profile tolerance divided by a compression range of the seal material.

3. A seal as in claim 1 wherein, in the uncompressed condition, the height of the stabilizers from the second sealing edge is about one half the total height of the seal.

4. A seal as in claim 3 wherein, in the uncompressed condition, the resilient stabilizers have a width of about 75% of the seal height.

5. A seal as in claim 1 wherein, in the uncompressed condition, the central section has a width of about 75% of the groove width.

6. A fluid container assembly comprising:

first and second components having opposed surfaces, one surface of the opposed surfaces including a seal receiving groove having a selected depth and width, a seal for sealing a gap between the opposed surfaces, the gap including a predetermined tolerance for clearance between the surfaces, the seal in its uncompressed condition including:

a linearly extending resilient seal body having a cross-sectional configuration including a generally rectangular central section of greater height than width with first and second sealing edges at opposite ends of the height dimension, the central section having first and second compressible portions extending inward from the first and second edges, respectively;

wherein the first compressible portion includes generally parallel sides supported in the groove with the first sealing edge engaging a bottom of the groove for sealing the groove against fluid passage across the groove; and the second compressible portion being unsupported by a groove, but including sides carrying resilient stabilizers angled outward from the second sealing edge and terminating in barb-like projections engagable with said one surface adjacent the groove and resiliently deformable to stabilize the unsupported second compressible portion upon compression of the seal, the barb-like projections including outer and inner sides which, when the seal is not compressed, are both angled outwardly away from the second sealing edge and joined at rounded ends engagable with said one surface;

the stabilizers and the second sealing edge closing a major portion of the clearance between the surfaces prior to compression of the seal, and the stabilizers resiliently engaging said one surface for stabilizing the second compressible portion to prevent buckling thereof during compression of the central section between the first and second sealing edges; whereby compression of the seal occurs over the complete length of the central section between the first and second sealing edges and the stabilizers act primarily to stabilize the second portion against buckling under compression and exert only limited compressive force against said one surface.

7. A fluid container assembly as in claim 6 wherein the uncompressed seal height equals the clearance variation of the assembly surfaces plus twice a seal profile tolerance divided by a compression range of the seal material.

8. A fluid container assembly as in claim 6 wherein, in the uncompressed condition, the height of the stabilizers from the second sealing edge is about one half the total height of the seal.

9. A fluid container assembly as in claim 6 wherein, in the uncompressed condition, the resilient stabilizers have a width of about 75% of the seal height.

10. A fluid container assembly as in claim 6 wherein, in the uncompressed condition, the central section has a width of about 75% of the groove width.

* * * * *